(12) United States Patent
Matama

(10) Patent No.: US 7,038,713 B1
(45) Date of Patent: May 2, 2006

(54) IMAGE PROCESSING APPARATUS

(75) Inventor: Toru Matama, Kanagawa (JP)

(73) Assignee: Fuji Photo Film Co., Ltd., Minami-ashigara (JP)

( * ) Notice: Subject to any disclaimer, the term of this patent is extended or adjusted under 35 U.S.C. 154(b) by 0 days.

(21) Appl. No.: 09/150,010

(22) Filed: Sep. 9, 1998

(30) Foreign Application Priority Data

Sep. 9, 1997 (JP) .................................. 9-243726

(51) Int. Cl.
*H04N 5/225* (2006.01)
*H04N 1/46* (2006.01)

(52) U.S. Cl. .................................. 348/207.2; 358/530

(58) Field of Classification Search ................ 348/96, 348/97, 98, 207.2, 333.12, 223.1, 221.1; 358/530, 452, 1.9, 453
See application file for complete search history.

(56) References Cited

U.S. PATENT DOCUMENTS

| | | | | |
|---|---|---|---|---|
| 4,973,149 A | * | 11/1990 | Hutchinson | 351/210 |
| 5,475,509 A | * | 12/1995 | Okamoto | 358/530 |
| 5,832,133 A | * | 11/1998 | Smith | 348/96 |
| 5,933,566 A | * | 8/1999 | Kishi et al. | 348/96 |
| 6,067,109 A | * | 5/2000 | Yamana | 348/97 |
| 6,094,218 A | * | 7/2000 | Suzuki et al. | 348/96 |
| 6,188,432 B1 | * | 2/2001 | Ejima | 348/333.12 |
| 6,285,398 B1 | * | 9/2001 | Shinsky et al. | 348/223.1 |
| 6,473,198 B1 | * | 10/2002 | Matama | 358/1.9 |

FOREIGN PATENT DOCUMENTS

| | | | |
|---|---|---|---|
| GB | 2299478 | * | 10/1996 |
| JP | 407074943 | * | 3/1995 |
| JP | 918704 | | 1/1997 |

* cited by examiner

*Primary Examiner*—Ngoc-Yen Vu
*Assistant Examiner*—Luong T. Nguyen
(74) *Attorney, Agent, or Firm*—Birch, Stewart, Kolasch & Birch, LLP

(57) ABSTRACT

The improved image processing apparatus comprises a device for receiving image data; image processor for performing necessary image processing on the received image data to produce output image data; a display for displaying an image carried by the image data supplied from a source of image data supply; a designating device for designating at least one principal part of the image displayed by the display; and a setting device for setting image processing conditions in accordance with the at least one principal part of the image designated by the designating device. The image processor performs the necessary image processing under the image processing conditions set by the setting device. The image processing apparatus allows the principal part of an image to be designated easily so that image processing conditions optimal for that principal part can be set. In digital photoprinters and like machines, high-quality prints reproducing images of high quality can be produced with high efficiency.

20 Claims, 5 Drawing Sheets point of designation point of designation

IMAGE PROCESSING APPARATUS

BACKGROUND OF THE INVENTION

The present invention relates to the technical field of a digital image processing apparatus for use with digital photoprinters and like machines that read the image on a film photoelectrically and output a print (photograph) having the image reproduced thereon.

Most of the image recorded on photographic films such as negatives and reversals (which are hereinafter referred to as "films") are conventionally printed onto light-sensitive materials (photographic papers) by a technique generally called "direct exposure" (analog exposure) in which the image on a film is projected onto the light-sensitive material for areal exposure.

A printer that adopts digital exposure has recently been commercialized. In this "digital photoprinter", the image recorded on a film is read photoelectrically and converted into digital signals, which are subjected to various kinds of image processing to produce recording image data; a light-sensitive material is exposed by scanning with recording light modulated in accordance with the image data, thereby recording a (latent) image which is then processed photographically to produce a print.

In digital photoprinters, the image is converted to digital image data and exposing conditions can be determined by processing that image data. Hence, by using such digital photoprinters, the correction of dropouts or blocked-ups due to photography with rear light or an electronic flash, the correction of color or density failures, the correction of under- or over-exposure, the correction for the insufficiency of marginal light, sharpening, the compression/expansion of the dynamic range of densities (imparting the dodging effect by processing of the image data) and various other kinds of image processing that have heretofore been impossible or difficult to accomplish by the direct exposure technique can be performed with high degrees of freedom to produce prints of much better quality. In addition, a plurality of images can be composited into a single image or one image can be split into segments or even characters can be composited by the processing of image data. If desired, prints can be outputted after desired editing/processing in accordance with a specific application.

The capability of digital photoprinters is by no means limited to outputting the image as a print (photograph) and they enable the image data to be supplied to computers or stored in recording media such as floppy disks; thus, with digital photoprinters, the image data can be used in various applications other than photography.

Having these features, the digital photoprinter is composed of the following three basic parts: a scanner (image reading apparatus) that reads the image on a film photoelectrically; an image processing apparatus that performs image processing of the read image to determine the exposing conditions for image recording; and a printer (image recording apparatus) that scan exposes a light-sensitive material in accordance with the determined exposing conditions and performs development and other necessary processes to produce a print.

In the scanner, the reading light issuing from a light source is allowed to be incident on the film, thereby producing projected light that carries the image recorded on the film; the projected light is then passed through an imaging lens to be focused on an image sensor such as a CCD sensor which performs photoelectric conversion to read the image, which is optionally subjected to various kinds of data processing before it is sent to the image processing apparatus as the image data (image data signals) from the film.

In the image processing apparatus, the image processing conditions are set on the basis of the image data that has been read with the scanner and image processing is applied to the image data in accordance with the thus set conditions, thereby producing output image data for image recording (i.e., exposing conditions) that are subsequently sent to the printer.

In the printer, if it is an apparatus that adopts exposure by scanning with optical beams, the beams are modulated in accordance with the image data supplied from the image processing apparatus and as said optical beams are deflected in a main scanning direction, the light-sensitive material is transported in an auxiliary scanning direction perpendicular to the main scanning direction, whereby the light-sensitive material is exposed to the image-carrying optical beams to form a latent image; the exposed light-sensitive material is then developed and otherwise processed in accordance with its type so as to produce a finished print (photograph) reproducing the image that has been recorded on the film.

As mentioned above, the image processing apparatus in a digital photoprinter sets the image processing conditions in accordance with the image data that has been read with the scanner and the image data is processed under the thus set image processing conditions to produce the output image data. This enables sharpening, dodging, color/gradation correction and various other kinds of image processing to be performed with a very high degree of freedom.

When performing these kinds of image processing, information about the principal part of the image is effective for setting the appropriate image processing conditions and producing an image of high quality.

The information about the principal part of an image is also important in the conventional photoprinter relying upon direct exposure. Users who receive the final print are satisfied to some extent if the principal part of the image (which is in most cases the face of a person) has appropriate levels of color and density; therefore, in direct-exposure photoprinters, the exposing conditions are so set that the principal part of the image will be finished appropriately to ensure consistent outputting of appropriate prints. However, direct-exposure photoprinters can adjust only the color and density of the image and no further adjustments of the image are possible.

Finishing the color and density of the principal part of the image is also important in digital photographers, however, in addition thereto for the digital photographers, an image processing availing the high degree of freedom of digital photoprinting was being expected strongly, as digital photographers enable the processing of an image (its adjustment) to be performed at a considerably higher degree of freedom than direct exposing photoprinters and hence, the information about the principal part of the image can be utilized more effectively, as mentioned already. However, conventional digital photoprinters were unable to comply fully with the expectation.

For example, it may be possible to produce high quality image prints satisfactory to users by conducting the image processing's in a manner suited best for the contents of image scenes (such as figure or scenery photographs). However, for accomplishing such image processing, it is necessary to interrupt the continues work for obtaining image processing conditions suitable for respective image for imputing image scenes, and to set up again image processing conditions suited best for the imputing image scenes, and so the processing results in a problem of extremely lowered productivity.

SUMMARY OF THE INVENTION

An object, therefore, of the present invention is to solve the problem of the conventional art mentioned above, and to provide a digital image processing apparatus that is suitably used with digital photoprinters and the like machines and that enables the principal part of an image to be designated easily, thereby setting image processing conditions that are optimal for the designed principal part of the image without lowering the productivity, and that allows for consistent production of high-quality prints that reproduce images of high quality.

The stated object of the invention can be attained by an image processing apparatus comprising:

means for receiving image data from a source of image data supply;

image processing means for performing necessary image processing on the received image data to produce output image data;

display means for displaying an image carried by the image data supplied from said source of image data supply;

designating means for designating at least one principal part of the image displayed by said display means; and setting means for setting image processing conditions in accordance with said at least one principal part of the image designated by said designating means;

wherein said image processing means performs said necessary image processing under said image processing conditions set by said setting means.

Preferably, said designating means comprises a mouse or a keyboard to designate at least one point of said image displayed by said display means.

Preferably, said designating means comprises a light pen to designate at least one point of said image displayed by said display means and said display means is a display for inputting with said light pen.

Preferably, said designating means comprises a touch panel.

Preferably, said designating means comprises means for obtaining shooting information of camera corresponding to said image data supplied from said source of image data supply.

Preferably, said designating means comprises means for inputting a position of at least one point of said image displayed by said display means by an operator's line of vision.

Preferably, said designating means comprises point designating means for designating at least one point in said at least one principal part, and extracting means for automatically extracting said at least one principal part based on an information about said at least one point in said at least one principal part designated by said point designating means, and said setting means sets the image processing conditions in accordance with a region containing said at least one principal part extracted by said extracting means.

Preferably, said extracting means automatically extracts said region containing said at least one principal part in view of image continuity, in accordance with said information about said at least one point in said at least one principal part designated by said point designating means.

Preferably, said at least one principal part of said image comprises a plurality of principal parts and said point designating means is of a type that designates one point in one of said plurality of principal parts and said extracting means automatically extracts at least one other principal part in said plurality of principal parts, based on said information about said one point in said one principal part designated by said point designating means.

Preferably, said extracting means automatically extracts the region containing the thus designated one principal part and the region containing at least one other principal part in said plurality of principal parts in view of said image continuity, based on said information about said one point in said one principal part designated by said point designating means.

Preferably, said display means is of a type that displays the image as it is divided into a plurality of regions and said designating means is of a type that designates at least one of the thus divided plurality of regions and said setting means sets the image processing conditions in accordance with the thus designated at least one region.

Preferably, said display means is of a type that also displays said at least one principal part designated by said designating means and which further includes modifying means that modifies said at least one principal part displayed by said display means.

Preferably, said display means is of a type that also displays at least one of said at least one principal part having one point designated by said point designating means and said at least one principal part automatically extracted by said extract means, and which further includes modifying means that modifies said at least one principal part displayed by said display means.

Preferably, said display means is of a type that also displays the region of said at least one principal part automatically extracted by said extract means and which further includes modifying means that modifies the region containing said at least one principal part displayed by said display means.

Preferably, said display means is of a type that also displays at least one of said one principal part having one point designated by said point designating means, and at least one other principal part in said plurality of principal parts automatically extracted by said extract means, and which further includes modifying means that modifies the region containing said at least one of said plurality of principal parts displayed by said display means.

Preferably, said display means is of a type that also displays at least one of the region containing the thus designated one principal part and the region containing at least one other principal part in said plurality of principal parts and which further includes modifying means that modifies the region containing said at least one principal part displayed by said display means.

Preferably, said image processing means performs at least one image processing selected from the group consisting of sharpness enhancement, dodging, contrast correction and color modification as said necessary image processing.

According to these methods, the principal part of the image can be designated by a point or a predetermined region and, hence, the burden on the operator is much smaller than in the case where the principal part of the image has to be selected using a pointing device such as a mouse.

Accordingly, for digital photoprinters equipped with image processing apparatus of the present invention, it is important to utilize, similarly to the direct exposing analog photoprinters, information about the principal part obtained by the commanding means for finishing appropriately the color/density of the principal part, information about the principal part can be utilized more effectively due to being able to accomplish image processing (image arranging) with far higher degree of freedom than analog photoprinters.

For example, information about the principal part is quite effective as auxiliary information for understanding image scenes (such as figure or scenery photographs), through which image processing conditions are settled properly to enable the image processing accordingly, and so it is possible to produce high quality image prints satisfactory to users by conducting the image processing in a manner suited best for the contents of image scene.

Moreover, commanding of the principal part are not so hard for operators and ready accomplished even by unskilled operators, and operators having dealt with commanding mechanism of principal part for direct exposure digital photoprinters can probably manage similarly commanding of the principal part of digital photoprinter for direct exposure digital photoprinter, since the commanding of the principal part can be managed similarly in principle.

DETAILED DESCRIPTION OF THE INVENTION

The image processing apparatus of the invention will now be described in detail with reference to the preferred embodiments shown in the accompanying drawings.

Figure 1:
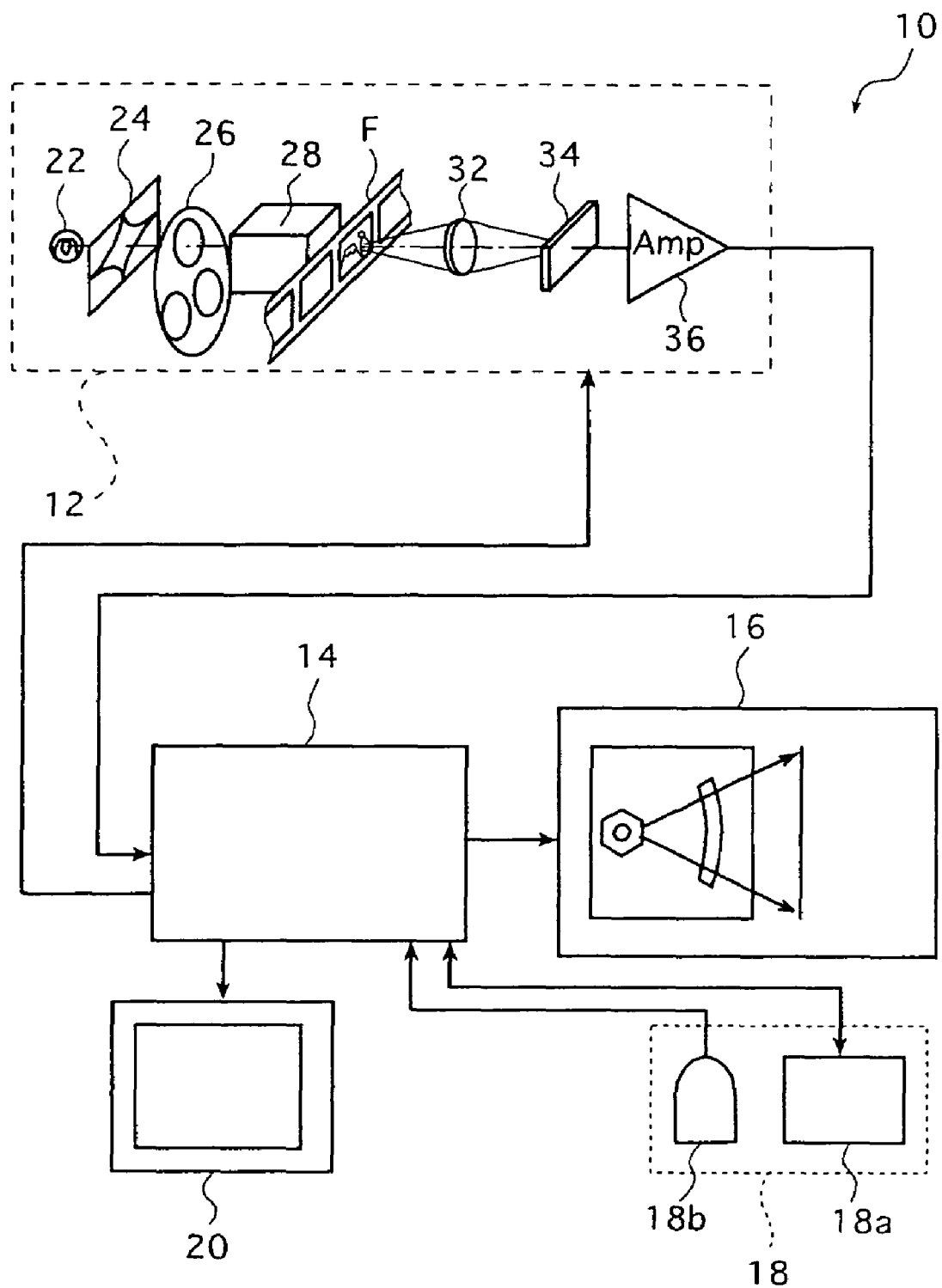
FIG. 1 is a block diagram for an exemplary digital photoprinter using the image processing apparatus of the invention.

FIG. 1 is a block diagram for an exemplary digital photoprinter using the image processing apparatus of the invention. The digital photoprinter generally indicated by 10 in FIG. 1 and which is hereinafter referred to simply as the "photoprinter" basically comprises: a scanner (image reading apparatus) 12 that reads the image on a film F photoelectrically; an image processing apparatus 14 that performs image processing of the thus read image data (image information), that selects, sets and changes the image processing conditions, and that allows for manipulation and control of the photoprinter 10 in its entirety; and a printer (image recording apparatus) 16 that exposes a light-sensitive material A imagewise with optical beams modulated in accordance with the image data processed in the image processing apparatus 14, develops and otherwise processes the material A and outputs it as a (finished) print P.

Connected to the image processing apparatus 14 are a manipulating unit 18 having a keyboard 18a and a mouse 18b to enter (set) various conditions, to select and issue a command for a specific processing step and to enter commands for color/density correction, as well as a display 20 that displays the image read with the scanner 12, various kinds of manipulative instructions, and screens on which various conditions are set and/or registered.

In the illustrated image processing apparatus 14, the manipulating unit 18 comprises a portion of the means of designating the principal part of an image.

The scanner 12 is an apparatus for reading the image on the film F photoelectrically frame by frame. It comprises a light source 22, a variable diaphragm 24, a color filter plate 26 that has three color filters for separating the image into three primaries R (red), G (green) and B (blue) and which rotates to insert any one of the color filters into the optical path, a diffuser box 28 with which the reading light incident on the film F is made uniform on the plane of the film F, an imaging lens unit 32, a CCD sensor 34 which is an area sensor that reads the image in each frame of the film, and an amplifier 36.

The illustrated photoprinter 10 has dedicated carriers available that can be selectively mounted in the housing of the scanner 12 depending upon such factors as the type and size of films such as an Advanced Photo System and negatives (or reversals) of 135—in size, the physical form of the film (e.g. whether it is a strip or a slide) and the kind of treatment to be applied (e.g. trimming). By changing carriers, the photoprinter 10 is capable of handling various kinds of films and treatments.

In the scanner 12, reading light issuing from the light source 22 is adjusted in quantity by passage through the variable diaphragm 24, then passed through the color filter plate 26 for color adjustment, and diffused in the diffuser box 28; the thus treated reading light is incident on the film F, through which it is transmitted to produce projected light that carries the image in a particular frame of the film F.

The projected light from the film F passes through the imaging lens unit 32 to be focused on the light-receiving plane of the CCD sensor 34 and read with the CCD sensor 34 photoelectrically; the resulting output signal is amplified with the amplifier 26 and thereafter sent to the image processing apparatus 14.

The CCD sensor 34 may be an area CCD sensor having for example 1380×920 pixels. In the illustrated system, the CCD sensor 34 is adapted to move around two-dimensionally (both horizontally and vertically along the pixels) by an amount equivalent to half a pixel; because of this feature, the number of pixels that can be read with the CCD sensor 34 is apparently increased by a factor of up to 4.

In the scanner 12, the above-described process of image reading is performed three times by sequentially inserting the respective color filters in the color filter plate 26 into the optical path of the reading light, whereupon the image in one frame is separated into three primaries R, G and B.

Prior to fine scanning, or the image reading for outputting a print P, the photoprinter 10 performs prescanning, or reading of the image at a lower resolution, in order to determine the image processing conditions and so forth. This means the image reading is performed a total of six times for one frame.

In the illustrated photoprinter 10, the scanner 12 that reads the image on a film such as a negative or reversal photoelectrically is used as a source of supplying image data to the image processing apparatus 14. Other sources may of course be used to supply image data into the image processing apparatus of the invention which encompasses the illustrated image processing apparatus 14 and they are exemplified by various kinds of image reading means, imaging means and image data storage means including an image reading apparatus that reads the image on a reflection original, a digital camera, a digital video camera, communication means such as a LAN (local area network) and a computer conferencing network and various other media such as a memory card and MO (magnetooptical recording medium).

As already mentioned, the output signal (image data) from the scanner 12 is delivered to the image processing apparatus 14.

Figure 2:
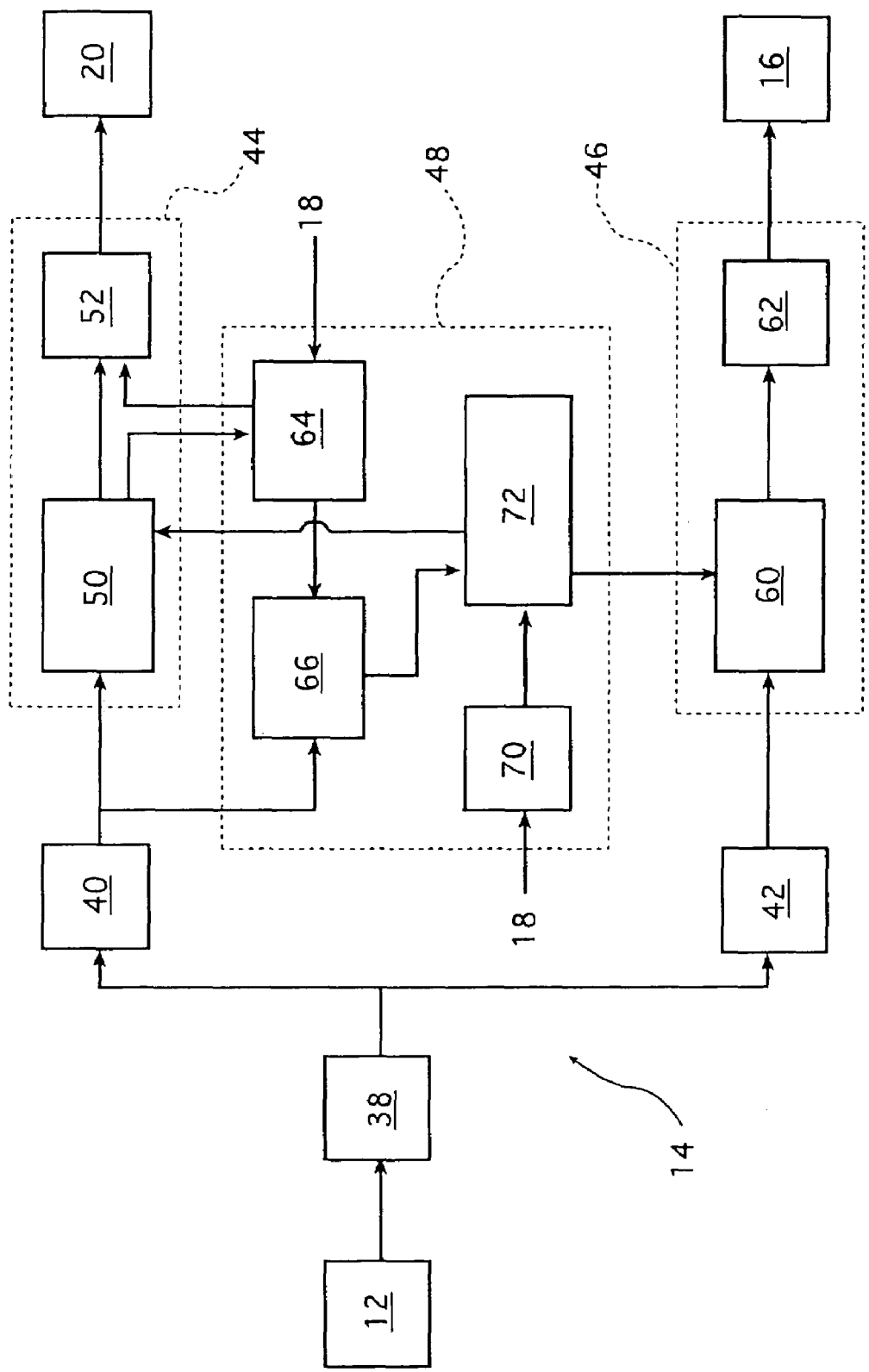
FIG. 2 is a block diagram for an example of the image processing apparatus in the digital photoprinter shown in FIG. 1.

FIG. 2 is a block diagram for the image processing apparatus 14. As shown, the image processing apparatus 14 (hereinafter referred to simply as the "processor 14") comprises a data processing section 38, a prescan (frame) memory 40, a fine scan (frame) memory 42, a prescanned image processing section 44, a fine scanned image processing section 46, and a condition setting section 48.

FIG. 2 is mainly intended to show the sites that are related to image processing. In addition to the components shown in FIG. 2, the image processor 14 includes a CPU that controls and manages the photoprinter 10 in its entirety including the image processor 14, a memory that stores the information typically necessary for the operation of the photoprinter 10, and means for determining a specific value to which the diaphragm 24 should be stopped down and the storage time of the CCD sensor 34. The manipulating unit 18 and the display 20 are connected to the associated sites via the CPU and related parts (i.e., CPU bus).

The output signals associated with R, G and B that have been delivered from the scanner 12 are processed in the data processing section 38 where they are subjected to various processes including A/D (analog/digital) conversion, log conversion, DC offset correction, darkness correction and shading correction and the resulting digital image data is stored in the prescan memory 40 if it is prescanned image data and in the fine scan memory 42 if it is fine scanned image data.

It should be noted here that the prescanned (image) data and the fine scanned (image) data are essentially the same except for the pixel density and the signal level. In the illustrated apparatus, the amount by which the diaphragm 24 is stopped down during fine scanning is set to an optimal value on the basis of the prescanned data by means of the processor 14 and the signal levels of the prescanned and fine scanned data are varied accordingly.

The prescanned data stored in the prescan memory 40 is processed in the prescanned image processing section 44 and the fine scanned data stored in the fine scan memory 42 is processed in the fine scanned image processing section 46.

The prescanned image processing section 44 comprises an image processing subsection 50 and a color transform signal processing subsection 52. The fine scanned image processing section 46 also comprises an image processing subsection 60 and a color transform signal processing subsection 62.

The image processing subsection 50 in the prescanned image processing section 44 (which is hereinafter referred to as "processing subsection 50") and the image processing subsection 60 in the fine scanned image processing section 46 (which is hereinafter referred to as "processing subsection 60") are both a site at which the image (image data) read with the scanner 12 is subjected to a specified kind of image processing in accordance with the image processing conditions set by means of the condition setting section 48 that will be described below in detail. Except for the pixel density of the image data to be processed, the two processing subsections perform essentially the same processing.

The image processing to be performed by the processing subsections 50 and 60 may be exemplified by at least one process selected from gray balance adjustment (color balance adjustment), contrast correction (toning), lightness correction, sharpening, dodging (compression/expansion of the dynamic range of densities), color fogging, color modification, blurring and the correction of an exposing light source.

These corrections may be performed by any known methods that comprise appropriate combinations of arithmetic operations for image processing, processing with LUTs, matrix operations and processing with filters. For instance, gray balance adjustment, lightness correction and contrast correction are each performed using correction (adjustment) tables constructed in correspondence with each process. Sharpening is performed by a method in which the difference between an averaged image (produced by averaging the original image) and the original image is multiplied by a coefficient of sharpness correction and the resulting image is added to the averaged image or the original image. For dodging, a blurred image (data) is generated by filtering and then used to compress or expand the dynamic range of the original image (see, for example, the specifications of Japanese Patent Application Nos. 165965/1995, 337509/1995 and 207941/1997).

The color transform signal processing subsection 52 in the prescanned image processing section 44 is a site at which the image data processed by the processing subsection 50 is transformed with LUTs or like means to produce image data corresponding to the display on the display 20, with optional enlargement/reduction of the displayed image.

The color transform signal processing subsection 62 in the fine scanned image processing section 46 is a site at which the image data processed by the processing subsection 60 is transformed to image data corresponding to image recording by the printer 16, to which it is then supplied.

The kinds of image processing to be performed by the processing subsection 50 in the prescanned image processing section 44 and by the processing subsection 60 in the fine scanned image processing section 46, as well as the conditions for such image processing are set by the condition setting section 48.

The condition setting section 48 comprises a principal part extracting subsection 64, an image processing condition setting subsection 66, a key correcting subsection 70 and a parameter coordinating subsection 72.

The principal part extracting subsection 64 (which is hereinafter referred to simply as "extracting subsection 64") is a site at which in accordance with the image's principal part designated by the operator as he looks at the image displayed on the display 20, the region of the principal part is extracted from the image read with the scanner 12.

Figure 3:
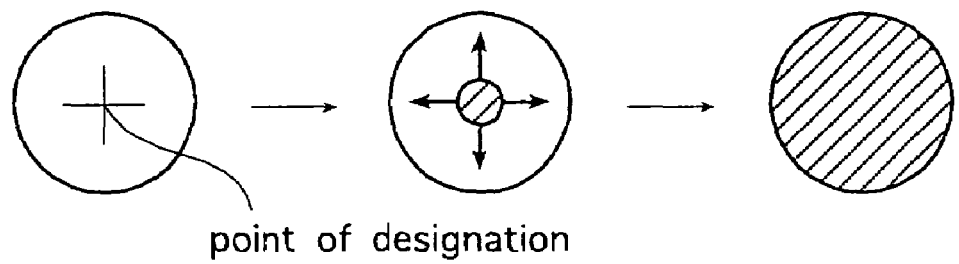
FIG. 3 shows in conceptual form an exemplary method of extracting the principal part of an image in the image processing apparatus shown in FIG. 2.
Figure 4:
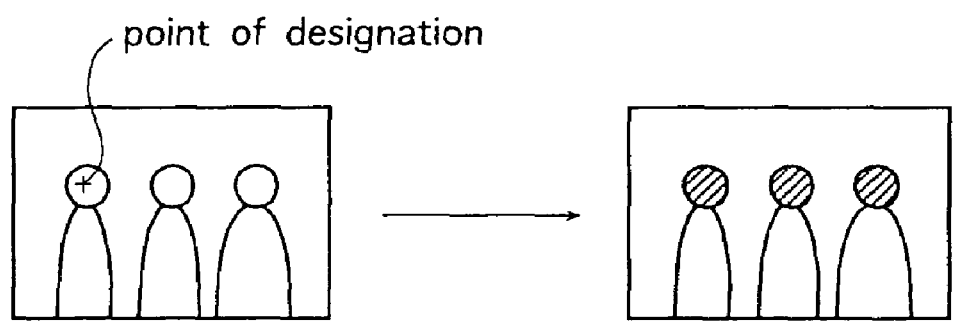
FIG. 4 shows in conceptual form an exemplary method of designating the principal part of an image in the digital photoprinter shown in FIG. 1.

In the illustrated case, the operator may designate the image's principal part by designating a point in the principal part of the image (prescanned image) on the display 20 with the aid of the mouse 18b or the keyboard 18a. In response to this designation of the principal part, the extracting subsection 64 evaluates the continuity (e.g. color continuity) of the image from the designated point of the principal part and expands the point until it reaches the boundary where color discontinuity occurs, whereby the region of the principal part of the image is extracted (see FIG. 3).

If the principal part of the image is the face of a person, it often occurs that more than one principal part is contained in one picture. In this case, the operator may designate all principal parts of the image. More preferably, the processor 14 of the invention is adapted to be such that one of the principal parts is designated and on the basis of the color, shape or other information of the designated principal part, the other principal parts (or their regions) are searched automatically and extracted.

The method by which the operator designates the principal part of the image on the display screen is in no way limited to the use of the mouse 18b or keyboard 18a. If the display 20 is compatible with a light pen, the principal part of the image may be designated using such light pen. If the display 20 is a touch panel, the principal part may be designated by touching with a finger. If desired, a known line-of-vision detector may be used to input the principal part of the image on the display 20 by directing the operator's line of vision to the target.

The films used with an Advanced Photo System are provided with magnetic recording tracks and the magnetic recording means in the camera can record shooting information such as the position of the principal part of the image taken, magnification and the shooting format. Therefore, if the position of the principal part (e.g. the face of a person) has been recorded on the film F by using such shooting information, this may be substituted for the designation of the principal part.

Figure 5:
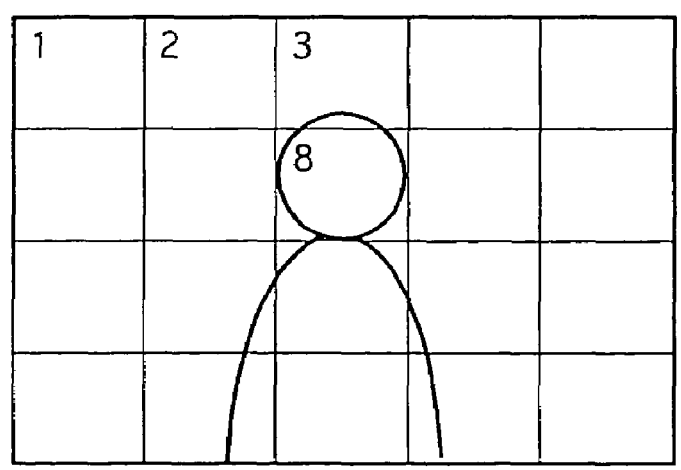
FIG. 5 shows in conceptual form another exemplary method of designating the principal part of an image in the digital photoprinter shown in FIG. 1.

Another preferred method of designating and extracting the principal part of an image is shown in FIG. 5; the image on the display 20 is divided into several regions and the operator selects the region that contains the principal part (which is region 8 in the illustrated case) and designates it as the region of the principal part. In this method, a portion of the image that is not the principal part is also counted in as the principal part or that portion of the principal part which is outside the designated region is counted out. However, in the usual case, this method allows image processing to be done with reasonably high precision. If necessary, more rapid and precise image processing can be accomplished by detecting an image of a large area within the detected region and by extracting the principal part in view of the continuity of that image.

In designating the principal part of an image by this method, all of the aforementioned techniques may be employed, including the use of the keyboard 18a, mouse 18b, a light pen and the fingertip pressure.

The aforementioned methods of extracting the principal part of an image in accordance with the invention provide much greater ease in extraction, thus achieving a significantly higher throughput than the conventional method in which the operator uses a mouse and other input devices to select the principal part of an image.

An even higher throughput can be realized by a design in which the principal part of an image is extracted automatically and displayed, with the operator designating the principal part only when he wants to modify it.

An exemplary method of automatically extracting the principal part of an image is described in Unexamined Published Japanese Patent Application (kokai) No. 138470/1997, according to which different methods of extraction as by extracting a specified color, extracting a specified geometrical pattern and eliminating a region estimated to represent the background, are evaluated preliminarily to determine the weights for the respective methods, the principal part of an image is extracted by each method and weighted by the predetermined weights and the principal part is identified and extracted accordingly.

Another method of extracting the principal part of an image is described in Unexamined Published Japanese Patent Application (kokai) No. 138471/1997, according to which the density or luminance of more than one point in a particular image is measured and the amount of the change between measurements is determined and the point with the amount of such change being greater than a specified value is set as a reference point; thereafter, a search scope and a pattern of search directions are set within a specified range from the reference point using a parameter such as the amount of change in density or luminance and a search is made for the point which, within the search scope and in the directions dictated by the pattern of search directions, experiences a change in density or luminance greater than a specified value; then, another search is made with reference to that point and the same procedure is repeated until a plurality of reference points are searched and set; the principal part of the image can be extracted by connecting these reference points.

Other methods that can advantageously be used in the present invention to extract the principal part of an image are described in Unexamined Published Japanese Patent Application (kokai) Nos. 346333/1992, 158164/1993, 165120/1993, 160993/1994, 184925/1996, 101579/1997, etc.

The result of extracting the principal part of an image either in response to the operator's command or automatically is optionally displayed on the display 20 and the operator, checking that result, may optionally adjust the principal part by such steps as cancellation, addition and modification.

According to an exemplary method of displaying the image's principal part, the image read with the scanner 12 is displayed on the display 20 and the region of the principal part of the displayed image is enhanced by a suitable technique such as halftoning, hatching or representation in a specified color. Another possible design is such that the principal part of the image can selectively be enlarged on the display 20 if this is necessary.

Figure 6:
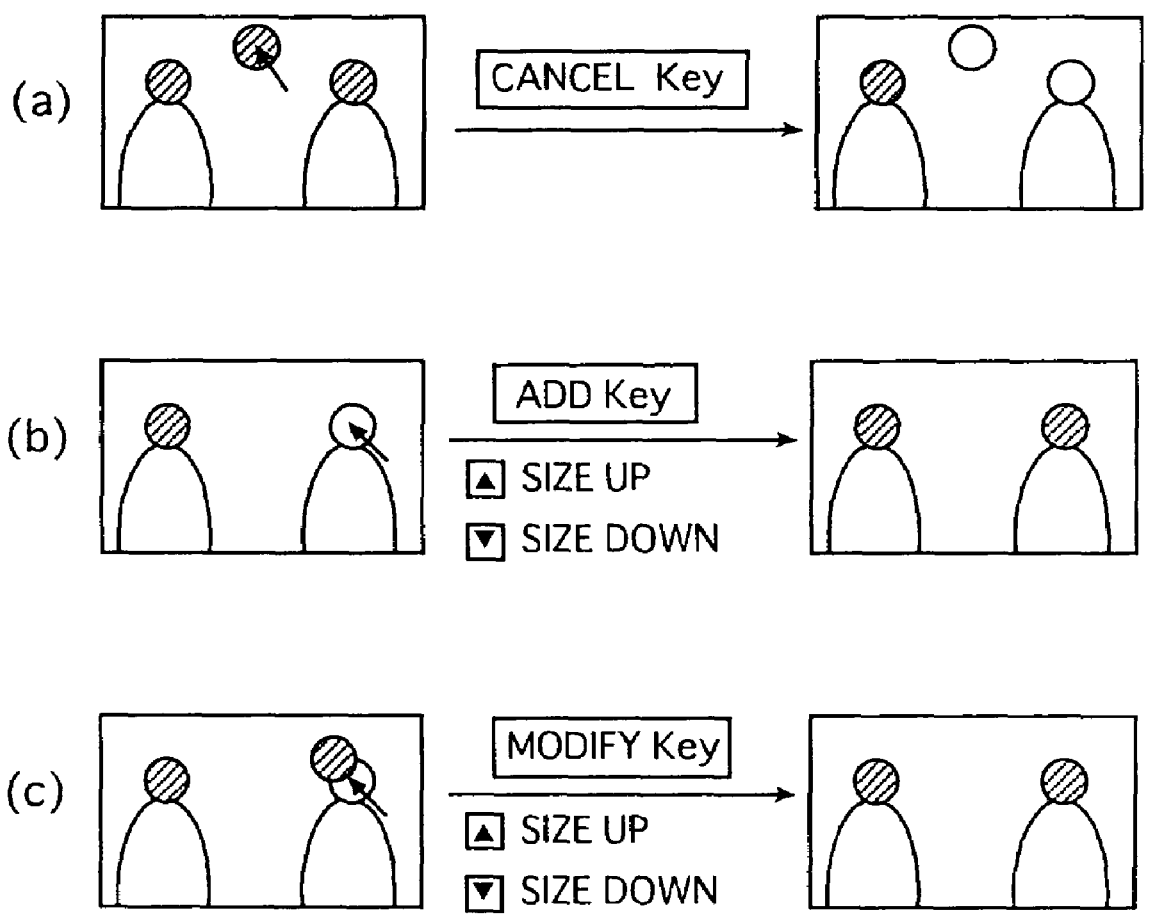
FIG. 6 shows in conceptual form three exemplary procedures of image processing in the image processing apparatus shown in FIG. 2.

Take, for example, the case where a region unsuitable as the principal part of the image (which is assumed to be the face of a person in the present discussion) has been extracted. Then, as shown in FIG. 6a, the unwanted region is designated by pointing with the mouse 18b or some other suitable means and canceled by pressing a CANCEL key on the keyboard 18a or the like.

In a different case, the region that should be extracted as the principal part of the image may have not actually been extracted. Then, as shown in FIG. 6b, an ADD key on the keyboard 18a or the like is pressed and the region to be added is designated by pointing with the mouse 18b or some other suitable means, whereupon the face of a person is added. If necessary, the size of the face (the region of the principal part) to be added may be adjusted by pressing a SIZE ADJUST key which may be a SIZE UP key or a SIZE DOWN key.

In another case, the extracted principal part may be offset from the appropriate position. Then, as shown in FIG. 6c, a MODIFY key on the keyboard 18a or the like is pressed and the offset principal part is designated by pointing with the mouse 18b or some other suitable means so that it is moved to the appropriate position. As in the previous case, the size of the face (the region of the principal part) to be modified may optionally be adjusted by pressing the SIZE ADJUST key.

The above-mentioned checking and adjusting steps need not always be performed and if the step of extracting the principal part of the image by the extracting subsection 64 ends, the operator may skip the checking step and immediately proceed to the step of setting the image processing conditions as will be described just below.

The process that does not include the checking step is suitable for the case where high throughput is important or the operator is not highly skilled. On the other hand, the process involving evaluation by the operator is suitable for the case where high product quality is important or the operator is highly skilled. Therefore, modes or otherwise selective means are preferably provided to enable the operator to perform or not perform checking.

In the image processing condition setting subsection 66 (which is hereinafter referred to simply as "setting subsection 66"), a certain kind of image processing that should be applied in accordance with the prescanned image and the extracted principal part of the image (or its region) is selected from the processes already mentioned above. At the same time, the setting subsection 66 sets the conditions for the image processing that should be performed in the processing subsections 50 and 60 to produce a display image and an output image, respectively, and supplies the thus set conditions to the parameter coordinating subsection 72.

Specifically, the setting subsection 66 constructs density histograms, calculates characteristic quantities of an image such as its average density, highlight (minimum density) and shadow (maximum density), calculates LATD (large-area transmission density) and performs any other operations to determine the kind of image processing to be executed and the conditions for that process.

When setting the conditions for image processing to produce an output image, the setting subsection 66 takes into account not only the prescanned data but also the designated (and extracted) principal part of an image and the relevant image data in order to determine the necessary image processing conditions.

As already mentioned, using the image processing apparatus of the invention, the operator designates the principal part of an image, optionally extracts its region and accordingly sets the image processing conditions, thereby ensuring that the appropriate image processing conditions can easily be set in accordance with a particular scene in the image so that images of an even higher quality are produced in a consistent manner.

Consider, for example, the case where the designated principal part of an image is the face of a person and its region is larger than a specified value. The setting subsection 66 concludes that the image is a close-up scene of the person and sets the image processing conditions such as to provide a softer tone and a less intense sharpness than in the usual case of image processing. Tone (gradation) adjustment may be performed by adjusting the table used in the aforementioned process of contrast correction. The sharpness intensity may be adjusted (lowered) by reducing the aforementioned coefficient of sharpness correction.

If the designated principal part of an image is the face of a person and if it is of a medium size (within a specified size range), the setting subsection 66 concludes that the image is a formal portrait or a scene of like nature and sets the usual standard image processing conditions.

If the designated principal part of an image is other than a person or his face or if no principal part of the image is designated, the setting subsection 66 concludes that the image is a landscape and sets a comparatively hard tone and a comparatively intense sharpness.

If the designated principal part of an image is the face of a person, the setting subsection 66 sets tables for gray balance adjustment, lightness correction and so forth in order to ensure that the face is finished to optimal values of color and density.

The key correcting subsection 70 is such that the amounts of adjustment of the image processing conditions are calculated in response to commands that are entered from the keyboard 18a or mouse 18b in the manipulating unit 18 for adjusting color, density, contrast (gradation) and other parameters, and the calculated values are supplied to the parameter coordinating subsection 72.

If an input for color adjustment is entered from the manipulating unit 18, the corresponding amount of correction is calculated in the key correcting subsection 70 and, in accordance with the calculated amount of correction, the parameter coordinating subsection 72 corrects the table for gray balance adjustment. If an input for density adjustment is entered, the table for lightness correction is similarly adjusted. If an input for contrast adjustment is entered, the table for contrast correction is likewise adjusted.

The parameter coordinating subsection 72 receives the image processing conditions set by the setting subsection 66, sets the supplied image processing conditions both in the processing subsection 50 in the prescanned image processing section 44 and in the processing subsection 60 in the fine scanned image processing section 46, and adjusts the thus set image processing conditions in accordance with the amounts of adjustments and the like calculated in the key correcting subsection 70.

The image processing apparatus of the invention will now be described in greater detail with reference to the action of the image processor 14.

When prescanned data is stored in the prescan memory 40 as mentioned above, the setting subsection 66 reads the stored data from the memory. Then, as also mentioned above, the setting subsection 66 constructs density histograms and calculates the characteristic amounts of the image, selects what image processing should be executed and sets the relevant image processing conditions. The thus set image processing conditions are sent to the parameter coordinating subsection 72 which sets those conditions in the processing subsection 50 in the prescanned image processing section 44.

In parallel with these steps, the scanner 12 performs fine scanning and the fine scanned data are sequentially transferred to and stored in the fine scan memory 42.

When the image processing conditions are set in the processing subsection 50, the prescanned data is read from the prescan memory 40 and processed in the processing subsection 50 under the thus set image processing conditions. The processed image data is also sent to the color transform signal processing subsection 52 which causes a prescanned image to be displayed on the display 20.

Looking at the displayed image, the operator uses the mouse 18b to designate a point in the principal part of the image on the display 20 as mentioned above. The designation of the principal part of the image as well as the image processed in the processing subsection 50 are both sent to the extracting subsection 64 which, as also mentioned above, extracts the region of the principal part of the image on the basis of color continuity.

When the principal part of the image has been extracted, the result is supplied to the color transform signal processing subsection 52 which, as also mentioned above, causes the principal part of the image to be displayed on the display 20.

The operator checks the designated and extracted principal part of the image and makes any necessary adjustments as shown in FIGS. 6a, 6b and 6c. If he finds that the principal part of the image has been extracted appropriately, he enters a command for finalizing that principal part.

As already noted, it is not absolutely necessary to check the extracted principal part of the image. If the checking step is eliminated, the step of displaying that principal part on the display 20 may be omitted.

When a command for finalizing the principal part of the image is issued, the setting subsection 66 receives the information about the region of the principal part from the extracting subsection 64 and either makes a second setting of the image processing conditions or calculates the amounts of adjustments of the previously set image processing conditions in accordance with the image data for the designated principal part or its region. The second setting of the image processing conditions or the adjustments thereof are sent to the parameter coordinating subsection 72, from which they are sent to both the processing subsection 50 in the prescanned image processing section 44 and the processing subsection 60 in the fine scanned image processing section 46 and set in these processing subsections.

As the result of this step, the prescanned image that has been read from the prescan memory 40 and displayed on the display 20 complies with the refreshed image processing conditions.

Looking at the display on the display 20, the operator verifies the image, or the result of the image processing, and optionally adjusts its color/density, gradation and other characteristic features with the aid of the keyboard 18a or mouse 18b.

The inputs of these adjustments are sent to the key correcting subsection 70, which calculates the amounts of correction of the image processing conditions in accordance with the entered inputs and sends them to the parameter coordinating subsection 72. As already mentioned, in accordance with the thus sent amounts of correction, the parameter coordinating subsection 72 corrects the image processing conditions that have been set in the processing subsections 50 and 60.

In accordance with this correction, or the operator-entered inputs of adjustments, the image displayed on the display 20 also varies.

If the operator concludes that the image displayed on the display 20 is appropriate (i.e., the result of the verification is satisfactory), he manipulates the keyboard 18a or mouse 18b to enter a command for starting the printing operation.

As the result, the image processing conditions are finalized and the fine scanned data is read from the fine scan memory 42, processed in the processing subsection 60 in the fine scanned image processing section 46 under the finalized conditions, sent to the color transform signal processing subsection 62, where it is converted to image data associated with the image recording by the printer 16, to which it is subsequently sent.

It should be remembered that the present invention is not limited to the case of the operator checking the result of image processing. If desired, the image processing conditions may be finalized at the point of time when the parameter coordinating subsection 72 ended the setting of those conditions in the processing subsection 60 in the fine scanned image processing section 46, whereupon the fine scanned data is processed automatically and sent to the printer 16. Preferably, modes or some other suitable selection means are provided to enable the operator to check or not check the result of image processing.

In the preceding cases, determination as to whether the result of extracting the principal part of an image is appropriate or not, determination as to whether the result of image processing is appropriate or not and entry of a command for printing are all effected by the operator, who then issues a command for proceeding to the next step. The present invention is in no way limited to these cases and as already mentioned, at least one of these operative and determining steps or even all of them may be performed automatically with the image processor 14.

As the process involves an increased number of operator-dependent steps, it becomes more suitable for a job that is executed by a highly skilled operator or for the purpose of producing high-quality prints. Conversely, a process involving an increased number of device-dependent automatic steps, it becomes more suitable for a job that is executed by an unskilled operator or for the purpose of increasing the throughput.

The operations described above may be performed by the operator who selects between an automatic mode and a manual mode as needed by a specific step in the process under execution. More preferably, as mentioned earlier, various modes are preset including a MANUAL mode in which all operations are performed by the operator, an AUTO mode in which all operations are executed automatically with the apparatus and a SEMIAUTO mode in which only the determination as to whether the result of image processing is appropriate or not and the entry of a command for printing are made by the operator or, alternatively, the user has an option to set these modes on the site, so that a suitable mode can be selected as appropriate for such factors as the desired print quality or the expertise of the operator.

Needless to say, the apparatus may be so adapted that during the process of operations in a selected mode, it can be interrupted by manipulation with the keyboard 18a or mouse 18b to enable either automatic or manual execution of a specified operation.

In the cases described above, prescanned data is used to extract the region of the principal part of the image, set the image processing conditions and perform other steps. The present invention is in no way limited to these cases and the steps exemplified above may be performed using fine scanned data. It should, however, be noted that steps such as the extraction of the principal part of the image and the setting of the image processing conditions need not be performed with image data of high pixel density. In addition, the calculation time increases with the number of pixels. Therefore, in consideration of various factors, especially the operating efficiency, the steps mentioned above are preferably performed using prescanned data.

It should also be noted that in the foregoing cases, prescanning is performed and the prescanned data is used to set the image processing conditions and perform other steps. However, the present invention is not limited to these cases and the scanner 12 may be designed to perform only fine scanning such that the fine scanned data is partly eliminated to prepare image data of a lower pixel density like the prescanned data, which is employed in extracting the principal part of the image, setting the image processing conditions and performing other steps.

Figure 7:
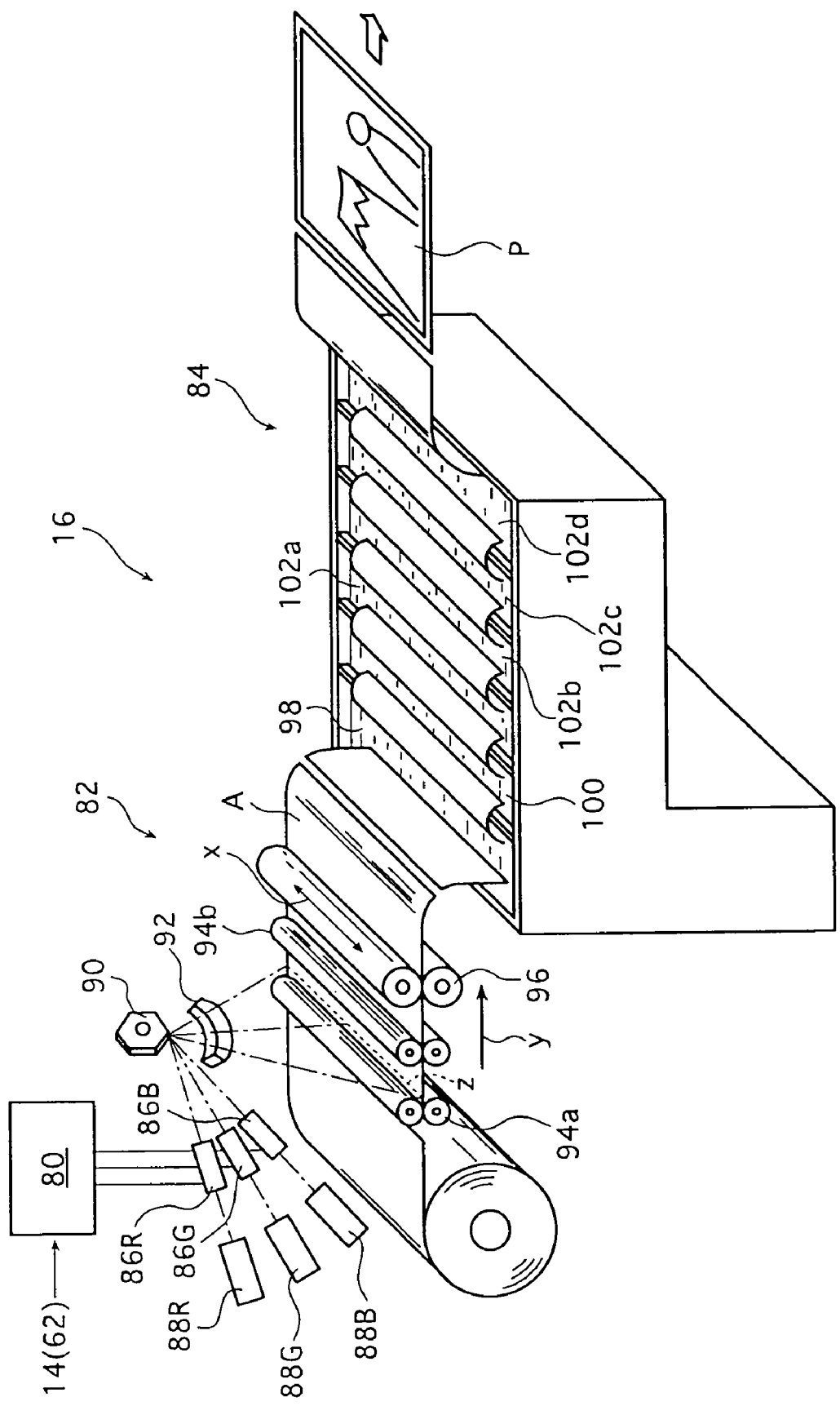
FIG. 7 shows diagrammatically the printer section of the digital photoprinter shown in FIG. 1.

As already mentioned, the image data processed in the image processing apparatus of the invention is subsequently sent to the printer 16 which is shown diagrammatically in FIG. 7. As shown, the printer 16 basically comprises a driver 80, an exposing section 82 and a developing section 84. Optical beams L are modulated, typically pulse-width modulated, in accordance with the image data sent from the image processor 14 and a light-sensitive material A is exposed with the modulated optical beams L.

The image data from the image processor 14 is sent to the driver 80. In the driver 80, the image data sent from the image processor 14 (particularly, the color transform signal processing subsection 62) is converted to signals that drive AOMs 86 such that they perform pulse-width modulation of the optical beams L in accordance with the image to be recorded (the amount of exposure).

In the exposing section 82, the light-sensitive material A is exposed by scanning with the modulated optical beams L such that the image associated with the aforementioned image data is recorded on the light-sensitive material A. As shown in conceptual form in FIG. 7, the exposing section 82 comprises a light source 88R that issues an optical beam in a narrow wavelength range capable of exposing the R-sensitive layer in the light-sensitive material A, a light source 88G similarly capable of exposing the G-sensitive layer, a light source 88B similarly capable of exposing the B-sensitive layer, AOMs 86R, 86G and 86B that modulate the optical beams from the respective light sources in accordance with the image to be recorded, a polygonal mirror 90 as an optical deflector, an fθ lens 92, and a means of transporting the light-sensitive material A in an auxiliary scanning direction.

The respective optical beams from the light sources 88R, 88G and 88B travel at different angles to be launched into the corresponding AOMs 86R, 86G and 86B. These AOMs 86 have been supplied from the driver 80 with drive signals R, G and B in accordance with the image to be recorded, or the image data supplied from the image processor 14 and being driven with these signals, the AOMs 86 modulate the incident optical beams in accordance with the image to be recorded.

The respective optical beams modulated with the AOMs 86 are incident at substantially the same point on the polygonal mirror 90, from which they are reflected for deflection in the main scanning direction (indicated by arrow x in FIG. 7) and adjusted by the fθ lens 92 such that they are imaged to give a specified beam shape in a specified scan position z to be incident on the light-sensitive material A. The exposing section 82 may be furnished with optical beam shaping means and tilt correcting optics as required.

A web of the light-sensitive material A is rolled on itself and contained in magazines which are loaded in specified positions.

The light-sensitive material A is unreeled with withdrawing rollers and cut with a cutter to a specified length corresponding to one print. By means of a pair of transport rollers 94a and 94b that are provided on opposite sides of the scan position z to constitute the means of transport in the auxiliary scanning direction (as indicated by arrow y in FIG. 7) which is perpendicular to the main scanning direction, the light-sensitive material A is transported in the auxiliary scanning direction as the scan position z is held constant relative to it.

Since the optical beams are deflected in the main scanning direction, the entire surface of the light-sensitive material A being transported in the auxiliary scanning direction is exposed by two-dimensional scanning with those beams, whereby the (latent) image associated with the image data transferred from the image processor 14 is recorded on the light-sensitive material A.

After the end of exposure, the light-sensitive material A is fed by means of a transport roller pair 96 into the developing section 84, where it is developed and otherwise processed to produce a print P.

If the light-sensitive material A is a silver salt light-sensitive material, the developing section 84 essentially comprises a color developing tank 98, a bleach-fixing tank 100, rinsing tanks 102a, 102b, 102c and 102d, a drying zone and a cutter (the latter two are not shown). After being developed and given the necessary treatments in the respective tanks, the light-sensitive material A is dried and outputted as a finished print P.

While the image processing apparatus of the present invention has been described above in detail, it should be noted that the invention is by no means limited to the embodiments described above and that various improvements and modifications can be made without departing from the scope and spirit of the invention.

As described in detail on the foregoing pages, the image processing apparatus of the invention allows the principal part of an image to be designated easily so that image processing conditions optimal for that principal part can be set. If the concept of the invention is applied to digital photoprinters and like machines, high-quality prints reproducing images of high quality can be produced with high efficiency.

What is claimed is:

1. An image processing apparatus comprising:
   means for receiving image data from a source of image data supply;
   image processing means for performing image processing on the received image data to produce output image data;
   display means for displaying an image carried by the image data supplied from said source of image data supply;
   designating means for designating at least one principal part of the image displayed by said display means; and
   setting means for setting image processing conditions in accordance with information about said at least one principal part of the image designated by said designating means;
   wherein said setting means calculates said image processing conditions using image data within said at least one principal part designated by said designating means and image data within an entire image area of said image, and sets said calculated image processing conditions in accordance with said information about said at least one principal part and information about said entire image area of said image, and
   said image processing means performs said image processing on said image data within said entire image area of said image under said image processing conditions set by said setting means.

2. The image processing apparatus according to claim 1, wherein said designating means comprises a mouse or a keyboard to designate at least one point of said image displayed by said display means.

3. The image processing apparatus according to claim 2, wherein extracting means automatically extracts a region containing said at least one principal part in view of image continuity, in accordance with an information about at least one point in said at least one principal part designated by a point designating means.

4. The image processing apparatus according to claim 1, wherein said designating means comprises a light pen to designate at least one point of said image displayed by said display means and said display means is a display for inputting with said light pen.

5. The image processing apparatus according to claim 1, wherein said designating means comprises a touch panel.

6. The image processing apparatus according to claim 5, wherein extracting means automatically extracts a region containing the thus designated one principal part and a region containing at least one other principal part in a plurality of principal parts in view of an image continuity, based on an information about one point in said one principal part designated by a point designating means.

7. The image processing apparatus according to claim 1, wherein said image designating means comprises means for obtaining camera shooting information corresponding to said image data supplied from said source of image data supply.

8. The image processing apparatus according to claim 1, wherein said designating means comprises means for inputting a position of at least one point of said image displayed by said display means by an operator's line of vision.

9. The image processing apparatus according to claim 1, wherein said designating means comprises point designating means for designating at least one point in said at least one principal part, and extracting means for automatically extracting said at least one principal part based on an information about said at least one point in said at least one principal part designated by said point designating means, and said setting means sets the image processing conditions in accordance with a region containing said at least one principal part extracted by said extracting means.

10. The image processing apparatus according to claim 9, wherein said display means also displays at least one of said at least one principal part having one point designated by said point designating means and said at least one principal part automatically extracted by said extracting means, and said image processing apparatus further includes modifying means that cancels an unwanted one of said at least one principal part displayed by said display means that is unsuitable as a principal part, adds a principal part to be designated by said designating means on said image displayed by said display means to said at least one principal part, or modifies a position, size or both of said at least one principal part displayed by said display means.

11. The image processing apparatus according to claim 9, wherein said extracting means automatically extracts said region containing said at least one principal part in view of image continuity, in accordance with said information about said at least one point in said at least one principal part designated by said point designating means.

12. The image processing apparatus according to claim 11, wherein said display means also displays the region of said at least one principal part automatically extracted by said extracting means and said image processing apparatus further includes modifying means that cancels an unwanted region unsuitable as a principal part in said at least one principal part displayed by said display means, adds a region to be extracted as a principal part by said extracting means on said image displayed by said display means to said at least one principal part, or modifies a position, size or both of the region containing said at least one principal part displayed by said display means.

13. The image processing apparatus according to claim 9, wherein said at least one principal part of said image comprises a plurality of principal parts and said point designating means is of a type that designates one point in one of said plurality of principal parts and said extracting means automatically extracts at least one other principal part in said plurality of principal parts, based on said information about said one point in said one principal part designated by said point designating means.

14. The image processing apparatus according to claim 13, wherein said display means also displays at least one of said one principal part having one point designated by said point designating means, and at least one other principal part in said plurality of principal parts automatically extracted by said extracting means, and said image processing apparatus further includes modifying means that cancels an unwanted region unsuitable as a principal part in said at least one principal part displayed by said display means, adds a region to be designated as a principal part by said designating means on said image displayed by said display means to said at least one principal part, or modifies a position, size or both of the region containing said at least one of said plurality of principal parts displayed by said display means.

15. The image processing apparatus according to claim 13, wherein said extracting means automatically extracts the region containing the thus designated one principal part and the region containing at least one other principal part in said plurality of principal parts in view of said image continuity, based on said information about said one point in said one principal part designated by said point designating means.

16. The image processing apparatus according to claim 15, wherein said display means also displays at least one of the region containing the thus designated one principal part and the region containing at least one other principal part in said plurality of principal parts and said image processing apparatus further includes modifying means that cancels an unwanted region unsuitable as a principal part in said at least one principal part displayed by said display means, adds a region to be designated as a principal part by said designating means on said image displayed by said display means to said at least one principal part, or modifies a position, size or both of the region containing said at least one principal part displayed by said display means.

17. The image processing apparatus according to claim 1, wherein said at least one principal part of said image comprises a plurality of principal parts and a point designating means is of a type that designates one point in one of said plurality of principal parts and extracting means automatically extracts at least one other principal part in said plurality of principal parts, based on an information about said one point in said one principal part designated by said point designating means.

18. The image processing apparatus according to claim 1, wherein said display means is of a type that displays the image as it is divided into a plurality of regions and said designating means is of a type that designates at least one of the thus divided plurality of regions and said setting means sets the image processing conditions in accordance with the thus designated at least one region.

19. The image processing apparatus according to claim 1, wherein said display means also displays said at least one principal part designated by said designating means and said image processing apparatus further includes modifying means that cancels an unwanted one of said at least one principal part displayed by said display means that is unsuitable as a principal part, adds a principal part to be designated by said designating means on said image displayed by said display means to said at least one principal part, or modifies a position, size or both of said at least one principal part displayed by said display means.

20. The image processing apparatus according to claim 1, wherein said image processing means performs at least one image processing selected from the group consisting of sharpness enhancement, dodging, contrast correction and color modification as said image processing.

* * * * *